(12) United States Patent
Kanazirev

(10) Patent No.: US 7,758,837 B2
(45) Date of Patent: Jul. 20, 2010

(54) SCAVENGERS FOR REMOVAL OF ACID GASES FROM FLUID STREAMS

(75) Inventor: Vladislav I. Kanazirev, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 984 days.

(21) Appl. No.: 11/123,642

(22) Filed: May 6, 2005

(65) Prior Publication Data

US 2006/0252642 A1   Nov. 9, 2006

(51) Int. Cl.
*B01D 53/12* (2006.01)
*B01D 53/68* (2006.01)
*B01J 20/08* (2006.01)

(52) U.S. Cl. ............... 423/240 S; 95/108; 502/415

(58) Field of Classification Search ................ 502/415; 423/420.2, 240 S; 95/108
See application file for complete search history.

(56) References Cited

U.S. PATENT DOCUMENTS

| | | | |
|---|---|---|---|
| 3,501,264 A | 3/1970 | Pilato et al. .................. 23/52 |
| 3,518,064 A | 6/1970 | Lewin .......................... 23/315 |
| 3,557,025 A | 1/1971 | Emerson et al. ............. 252/463 |
| 3,943,226 A | 3/1976 | Difford ....................... 423/230 |
| 4,468,375 A | 8/1984 | Misra ......................... 423/122 |
| 4,639,259 A | 1/1987 | Pearson ......................... 55/71 |
| 4,755,499 A * | 7/1988 | Neal et al. ................... 502/415 |
| 4,762,537 A | 8/1988 | Fleming et al. ................ 55/71 |
| 5,078,983 A | 1/1992 | Herold .................... 423/419 P |
| 5,316,998 A | 5/1994 | Lee et al. .................... 502/415 |
| 5,505,926 A | 4/1996 | Lee et al. ................. 423/240 R |
| 5,897,845 A | 4/1999 | Denny et al. ............... 423/210 |
| 5,935,894 A | 8/1999 | Kanazirev .................. 502/341 |
| 5,997,836 A * | 12/1999 | Sato et al. ................ 423/420.2 |
| 6,060,033 A | 5/2000 | Cheng ..................... 423/240 S |
| 6,200,544 B1 | 3/2001 | Blachman ............... 423/240 R |
| 6,362,261 B1 | 3/2002 | Lange et al. ................ 524/153 |
| 6,558,641 B1 | 5/2003 | Bailey et al. ............ 423/240 R |

* cited by examiner

*Primary Examiner*—Stanley Silverman
*Assistant Examiner*—James A Fiorito
(74) *Attorney, Agent, or Firm*—Mark Goldberg

(57) ABSTRACT

A composite sorbent is formed which is the reaction product of a solid alkali metal carbonate, rehydratable alumina and water or an aqueous solution of a metal salt. The reaction between the components occurs while forming particulates followed by curing and activation. In one embodiment, the composite contains an appreciable amount of a Dawsonite-type hydroxycarbonate as a final product or as an intermediate in at least one of the production stages. The alkali metal in the sorbent exhibits a highly reactive and accessible state that is very favorable for various sorption applications. The sorbent is especially useful for removal of HCl and other acid contaminants from gas and liquid hydrocarbon streams. It combines a high capacity for the contaminants with a low reactivity towards the hydrocarbon components of the main stream.

7 Claims, No Drawings

SCAVENGERS FOR REMOVAL OF ACID GASES FROM FLUID STREAMS

FIELD OF THE INVENTION

The present invention relates to a method for treating hydrocarbon streams to remove acid gases. More particularly, the present invention relates to a process using a catalytically inert sorbent for removing HCl from hydrocarbon-containing streams.

BACKGROUND OF THE INVENTION

Acid gases are present as impurities in numerous industrial fluids, i.e., liquid and gas streams. These acid gases include hydrogen halides such as HCl, HF, HBr, HI and mixtures thereof. For example, one of the key processes in refining petroleum is catalytic reforming. In the catalytic reforming process, a light petroleum distillate or naphtha range material is passed over a noble metal catalyst to produce a high octane product. Hydrogen is a by-product of the catalytic reforming process, and a portion of the byproduct hydrogen is recycled to the reaction zone to maintain catalyst stability. Typically, the noble metal reforming catalyst is promoted with chloride which, in the presence of hydrogen, results in the production of a small amount of hydrogen chloride. Thus, the net byproduct hydrogen withdrawn from the catalytic reforming process generally contains a small amount of hydrogen chloride. Similarly, in a process for the dehydrogenation of light isoparaffins to produce iso-olefins, the promoting of the noble metal catalyst with chloride will produce a net hydrogen stream containing small amounts of HCl. The net hydrogen produced in the catalytic reforming process and the dehydrogenation process is generally used in sensitive downstream catalytic processes. In addition, there are other hydrocarbon and chemical processes in which small amounts of HCl are generated and carried away in gas or liquid streams. Even small amounts of gaseous HCl present in the net hydrogen can seriously interfere with the operation of downstream processes which use the hydrogen and can cause corrosion problems in the equipment such as pipes, valves, and compressors which convey hydrogen. Generally, HCl in gas or liquid hydrocarbon streams must be removed from such streams to prevent unwanted catalytic reactions and corrosion to process equipment. Furthermore, HCl is considered a hazardous material and releasing the HCl to the environment must be avoided.

Currently, activated alumina is the most widely used sorbent in the petroleum refining and chemical industries. Activated alumina is employed as a scavenger for the removal of small quantities of HCl from fluid streams. Significant developments to improve the performance of alumina to remove HCl from hydrocarbon streams are disclosed in U.S. Pat. No. 4,639,259 and U.S. Pat. No. 4,762,537 which relate to the use of alumina-based sorbents for removing HCl from gas streams. U.S. Pat. No. 5,505,926 and U.S. Pat. No. 5,316,998 disclose a promoted alumina sorbent for removing HCl from liquid streams by incorporating an alkali metal oxide such as sodium in excess of 5% by weight on to an activated alumina base. It is also known that alumina can be promoted to adsorb more HCl by impregnating the alumina with sodium carbonate or sodium hydroxide or calcium hydroxide. U.S. Pat. No. 4,639,259 discloses the use of calcium acetate to improve the dispersion of the calcium oxide on the alumina to achieve higher sorption capacity. The use of promoted alumina compared to other alumina-based sorbents can extend the length of time a fixed amount of sorbent will adsorb HCl. By increasing the content of promoters such as sodium carbonate or sodium hydroxide, the HCl sorption capacity of the scavenger can be increased. However, the addition of promoters to alumina to improve the capacity of the sorbent for HCL appears to have a point of diminishing returns. Despite the type and amount of promoter incorporated into the alumina-based and promoted alumina materials, commercial experience shows that alumina-based and promoted alumina sorbents have a relatively low capacity for the sorption of HCl, often limited to levels less than 10 to 16 wt-% HCl.

Existing sorption processes for removing HCl from hydrocarbon-containing streams typically involve passing the hydrocarbon-containing fluid stream over the sorbent, which is disposed in a fixed bed. Conventionally, these fixed beds contain alumina-based sorbents wherein sodium or calcium is doped or coated on the alumina. Typically, the alumina-based and promoted alumina materials are formed into nodules or spheres. As the alumina-based sorbents pick up HCl, the sodium or calcium promoter, as well as the aluminum, reacts with HCl to form chloride salts. Because HCl molecules are able to form hydrogen bonds with chloride ions, a limited amount of HCl can become physically adsorbed on the surface of the salt molecules. However, the alumina sorbent in this service is known to have the undesirable property of converting certain hydrocarbons in the streams into a substance often called "green oil" which often collects in the fixed sorbent bed. Typically, these green oils are green or red in color. They generally contain chlorinated $C_6$ to $C_{18}$ hydrocarbons and are believed to be oligomers of light olefinic hydrocarbons. The presence of green oils in the fixed sorbent bed fouls the sorbent bed and results in the premature failure of the sorbent. When this fouling occurs, often costly measures are required to remove the spent sorbent from the bed. Furthermore, the chloride content of the green oils on the spent sorbent makes disposal of the spent sorbent an environmental problem. While the exact mechanism of green oil formation is unknown, it is believed that green oils are formed by catalytic reaction of aluminum chloride or HCl with the hydrocarbon. Green oil formation remains an unresolved industry problem during the removal of HCl from hydrocarbon streams.

When unsaturated hydrocarbons such as butadiene or other olefinic compounds are present in a hydrocarbon-containing stream, these compounds can be polymerized on acidic surfaces. Alumina based sorbents and promoted alumina sorbents, once they adsorb HCl, become acidic during the sorption process, and thus, acquire catalytic activity for the polymerization of the reactive hydrocarbons in the stream. When green oils are produced during the HCl sorption process, the spent sorbent represents a costly disposal problem. The formation of these polymers fouls the adsorbers, shortens sorbent life, and creates a problem for the disposal of the solid adsorbents now containing chlorinated hydrocarbons. Since an HCl sorbent is not regenerable, the treatment of streams with even moderate to high HCl content, such as an HCl sorbent with a capacity of 10 to 16 wt-%, requires the fixed bed of sorbent to be changed frequently and imposes a downtime on the upstream process. Because the change of sorbent beds containing polymerized hydrocarbons requires costly measures to dig the sorbent out of the sorbent bed, the loss of production time and the maintenance costs are especially significant. The polymerization or acidic reactivity of the Cl loaded adsorbents must be reduced to avoid these problems.

There are many compounds that are reactive to acid gases such as hydrogen halides which can be employed as a scavenger sorbent to remove trace amounts of acid gases from fluid streams. However, for a compound to function in a fluid stream from a process plant where hydrocarbons are present, the material must have good acid gas sorption capacity, have sufficient physical strength, and be catalytically inert in the presence of reactive hydrocarbons. Acid gases are present as contaminants in various industrial gas and liquid streams. The catalytic reforming process, which is widely employed for producing high quality gasoline components, is one of the major sources of HCl contaminated fluids. The catalysts used in the catalytic reforming are commonly promoted with chloride compounds. These compounds slowly come off the catalyst in the course of use, thereby contaminating some product streams with HCl and other contaminants. It is often necessary to remove these types of contaminants to prevent corrosion and fouling problems downstream. The present invention provides a material for removal of such contaminants.

It has been generally recognized that the efficiency of a chloride scavenger depends not only upon the content of the active metal incorporated into the material but also upon at least two more factors: the accessibility of the active component and the reactivity of the scavenger towards the main stream. In addition, the adsorbents should have sufficient mechanical strength to withstand the loading-unloading operations and other disturbances while in service.

Initially, activated (non-doped) aluminas were used for industrial removal of HCl. The low capacity of the activated aluminas and the high reactivity of the spent material resulting in the formation of "green oil" motivated the search for improved scavengers. Incorporation of alkali or alkaline earth elements into alumina carriers was then found to significantly improve the performance of the chloride scavengers. For examples of such use, see U.S. Pat. No. 3,557,025; U.S. Pat. No. 3,943,226; U.S. Pat. No. 4,639,259; U.S. Pat. No. 5,505,926; and U.S. Pat. No. 5,935,894.

U.S. Pat. No. 3,557,025 teaches the preparation of an alkalized alumina for removal of $SO_2$. This alkalized alumina which was made from a combination of alumina with a carbonate required the addition of alumina and sodium bicarbonate to a water suspension, followed by autoclaving for a period of hours.

Another early process for preparation of an alumina/carbonate product is described in U.S. Pat. No. 3,518,064 in which is disclosed a reaction of an alkali metal bicarbonate or ammonium bicarbonate and aluminum hydroxide that are heated together in the dry state. The product was to be used as a buffering composition especially in treatment of gastric hyperacidity.

More recent efforts to develop a useful adsorbent for removal of HCL from hydrocarbon streams include U.S. Pat. No. 6,060,033 and U.S. Pat. No. 6,200,544. In the '033 patent, Cheng taught that the preloading of water on a sodium promoted alumina adsorbent increased the HCl sorption capacity and decreased the catalytic reactivity of the adsorbent. Recently, in U.S. Pat. No. 6,200,544, Blachman taught the use of an adsorbent for removing HCl from fluid streams comprising activated alumina impregnated with alkali oxide and promoted with phosphate or organic amine or a mixture thereof.

In an attempt to increase the adsorbent performance, U.S. Pat. No. 5,897,845 disclosed absorbent granules comprising an intimate mixture of particles of alumina trihydrate, sodium carbonate or sodium bicarbonate or mixtures thereof and a binder, in which the sodium oxide content $Na_2O$ is at least 20% by weight calculated on an ignited (900° C.) base. This material was designated for use at temperatures below 150° C.

A recent patent, U.S. Pat. No. 6,558,641 to ICI, disclosed an attempt to improve the absorbent that was previously disclosed in the above discussed U.S. Pat. No. 5,897,845. This '641 patent taught the use of an alumina combined with both a zinc and an alkali metal component selected from the group consisting of oxides, hydroxides, carbonates, bicarbonates and basic carbonates as well as a binder. It is noted that these two patents disclosed both methods for manufacturing and for the use of the absorbent. The term "absorbent" is used to describe the scavenger which implies that the contaminant uptake while using the material occurs not only by adsorption but also by chemical reaction with the material.

In addition to noting the above prior art, a review of three classes of existing industrial HCl scavengers that are currently being marketed reveals undesirable characteristics of these materials. The alkali or alkaline-earth doped aluminas have an alkali metal content that is between 8 and 14% calculated as the oxide ($Na_2O$ for example). The relatively low equilibrium chloride loading of typically 12 to 14% is the biggest problem with these doped aluminas. Intimate mixtures of alumina, carbonate (bicarbonate) and binder are a second class of HCl scavengers. In U.S. Pat. No. 5,897,845 are described adsorbents having a $Na_2O$ content that is at least 20 wt-%. This higher level of the oxide indicates that the material has a high potential chloride loading. However, poor stability, tendency of caking and development of pressure drop upon adsorption of moisture, along with difficulties in discharging the spent adsorbent are among the disadvantages of this group. In addition, scavengers of this type cannot be used at higher temperature than 150° C. They have low BET surface area and insufficient porosity. Finally, there are several zinc containing scavengers such as described in the ICI patent. According to U.S. Pat. No. 6,558,641, the HCl scavenger described therein contains an alkali metal component and a binder beside the zinc component. The additional zinc component substantially increases the cost to manufacture the material. This increased cost is a significant disadvantage of this type of HCl scavengers. Also there are some performance issues including indications that the mass-transfer in these materials is slower than in the alumina based adsorbents. This leads to a reduced dynamic capacity. Finally, this group of scavengers may also exhibit reduced mechanical stability at the conditions of use.

In spite of the improvements in industrial scavengers of acid gases such as HCl, there remains a need to achieve further progress in this area. The specific technical problem that remains to be solved is to increase the chloride loading while maintaining sufficient BET surface area, porosity and mechanical stability of the solid scavenger combined with low tendency to produce "green oil".

SUMMARY OF THE INVENTION

The composite sorbents prepared according the present invention have significant advantages over the prior art since they are low cost materials exhibiting high BET surface area and porosity along with a high content of active component. These properties translate to high dynamic capacity in HCl removal from both gas and liquid fluids. A further advantage compared to some other prior art sorbents is that the sorbents of this invention do not require a separate binder to be added to the mixture in the forming process. They have sufficient mechanical stability in both fresh and spent state along with low reactivity towards the main stream. The invention comprises a process for making an adsorbent and the uses that can be made of this adsorbent. One method of preparation of the adsorbent comprises mixing at least one alumina compound with a solid metal carbonate and adding or spraying water on the mixture. In the practice of the present invention, the term "carbonate" includes inorganic compounds containing a $CO_3$ moiety including a bicarbonate or a basic carbonate. Then the mixture is allowed to stay at ambient conditions to cure or is heated to an elevated temperature that is a maximum of about 100° C. for a period long enough for the materials to react. A particularly useful carbonate is a sesquicarbonate. The metal in the metal carbonate may be sodium, potassium, lithium, zinc, nickel, iron or manganese. Other metals may be used as known to those skilled in the art.

The invention also comprises a process for the removal of at least one hydrogen halide from a fluid hydrocarbon-containing stream comprising hydrogen, hydrocarbons, water and hydrogen halide, wherein said process comprises contacting said fluid stream with a sorbent material in a packed bed, said sorbent material comprising a reaction product of at least one alumina and at least one solid metal carbonate. The solid metal carbonate is preferably at least one sesquicarbonate. The hydrogen halide is selected from the group consisting of hydrogen chloride, hydrogen fluoride, hydrogen iodide, hydrogen bromide and mixtures thereof. The invention is useful in the treatment of a fluid stream comprising a net hydrogen stream from a catalytic reforming process, where the hydrogen halide is hydrogen chloride. The invention is also useful in the treatment of a net hydrogen stream from a light paraffin dehydrogenation process where the hydrogen halide is also hydrogen chloride.

DETAILED DESCRIPTION OF THE INVENTION

At least two solid and one liquid component are needed to produce the reactive composite sorbent of the present invention. At least one carbonate powder and at least one alumina powder comprise the solid components and water or an aqueous solution of at least one salt is the liquid component.

The carbonate powder is preferably an alkali metal carbonate in a powder form. Small particles, preferably about 5 to 10 microns in diameter, are employed. A carbonate component that has been found to provide excellent results in the present invention is the natural carbonate (soda ash) ore known as Trona or Nahcolite. A popular source of such natural carbonate is the Green River occurrence in Wyoming, US. The book NATURAL SODA ASH: OCCURRENCES, PROCESSING AND USE, authored by Donald E. Garrett, Van Nostrand Reinhold publication, 1992, summarizes important characteristics of natural carbonates. Other carbonates that can be used include Wegscheiderite ($Na_2CO_3.NaHCO_3$), Thermonatrite ($Na_2CO_3.H_2O$), Shortite ($Na_2CO_3.2CaCO_3$), and Eitelite ($Na_2CO_3.MgCO_3$).

One such carbonate that has been found especially useful is a natural sodium sesquicarbonate, marketed by Solvay Chemicals, Houston, Tex. as Solvay T-200®. A sesquicarbonate has a formula of $Na_2CO_3.NaHCO_3.2H_2O$. It produces 1.5 mols sodium carbonate ($Na_2CO_3$) upon heating at sufficiently high temperature. Table 1 presents some properties of this product as reflected in the producer's technical data sheet.

TABLE 1

| Component | Typical Analysis |
|---|---|
| $Na_2CO_3 \cdot NaHCO_3 \cdot 2H_2O$ | 97.5% |
| Free Moisture | 0.01 |
| Water Insoluble | 2.3% |
| NaCl | 0.1 |
| Bulk Density | 785 kg/m³ |
| | (49.0 lbs/ft³) |
| Sieve Opening, micrometers | Weight Percent |
| <70 | 75 |
| <28 | 50 |
| 6 | 10 |

The carbonate raw material was found to have a typical FTIR (Fourier Transform Infrared) spectrum characterized with absorbance peaks at about 3464, 3057, 1697, 1463, 1190, 1014, 850 and 602 $cm^{-1}$, corresponding to the values published for this material.

An alumina powder that has been found to be useful in the present invention is a transition alumina powder produced by the rapid calcination of $Al(OH)_3$, known as Gibbsite. Alumina A-300, sold by UOP LLC, Des Plaines, Ill., is a typical commercial product that is suitable as a component of the reactive composite of the present invention. This alumina powder has a BET surface area of about 300 m²/g and about 0.3 wt-% $Na_2O$. It contains only a few percent free moisture and is capable of fast rehydration in the presence of water. The FTIR spectrum of A-300 has the broad absorbance peaks due to Al—O vibration at about 746 and 580 $cm^{-1}$, with only a few additional peaks of OH (3502 and 1637 $cm^{-1}$) and $CO_3$ of surface carbonate species (1396 and 1521 $cm^{-1}$) are present.

The third component is water, or optionally an aqueous solution of a salt, which plays an important role in facilitating a reaction between the carbonate and alumina powder. The preferred salts include metal salt is selected from the group consisting of sodium acetate, sodium oxalate and sodium formate. The preferred average particle size D50 for the alumina component and the carbonate ingredient is from about 5 to 12 µm, although larger particles may be used, especially for the carbonate ingredient. The alumina and the sesquicarbonate are present in a ratio of about 0.8 to about 5. Preferably, the alumina and the sesquicarbonate are present in a ratio of about 2 to 4.

It has been found that that there is no reaction between the sesquicarbonate and alumina when a mixture is heated in a dry state to about 100° C. However, heating the dry mix to a an initial temperature of from 300° C. up to 600° C. converts the sesquicarbonate to sodium carbonate. In contrast, the presence of additional water followed by brief calcination at 100° C. triggers a reaction between the sesquicarbonate and alumina. The product was found to be Dawsonite crystals having a particle size of less than about 200 angstroms. Example 1 describes the process to produce this phenomenon.

EXAMPLE 1

About 19 g T-200® sesquicarbonate powder and 45 g A-300 alumina were placed in a small rotating pan made from the bottom of a plastic bottle. The pan had a diameter of about 12.7 cm (5 inches) and a height of about 15.2 cm (6 inches). It rotated at about 120 rpm at an inclination of about 45 degrees. The powder was occasionally stirred using a spatula and hand sprayed with water to form particulates. A total of about 16.25 g water was added before the particulates began to stick together. At that point the addition of water ceased and a small amount of additional A-300 powder was added in order to restore the free flowing pattern of particulates.

The particulates had a broad particle size distribution ranging from about 40 mesh to about 3 mesh. Other than some spherical beads, most of the particles had a rather irregular form.

All particulates were placed in a closed glass container and allowed to cure for about 2 hours followed by calcination at 100° C. for about 3 hours in an air circulated oven. The material lost about 27.3% of its weight upon calcination. After cooling, the size fraction 7×20 mesh of the particulates was screened out for further testing, FTIR and Cl pickup in particular.

It was found that the carbonate and alumina components reacted in presence of water upon formation of a product that was identified as similar in spectra to aluminum containing hydroxycarbonate Dawsonite—$NaAl(OH)_2CO_3$. The identification is based on the characteristic vibrations in the spectrum compared with the reference published by P. A. Estep and C. Karr, Jr. in "The Infrared Spectrum of Dawsonite", AMERICAN MINERALOGIST, 53, 305 (1968). The consumption of alumina in the course of reaction is evident by the decrease of the absorbance at about 746 cm$^{-1}$. The spectrum of the product had characteristic absorbance peaks at 3290, 1560, 1398, 1097, 956, 846, 684 and 548 cm$^{-1}$. At least five of these peaks would be seen. Independently, the FTIR identification of the reaction product was confirmed on a similar material by X-ray diffraction. The X-ray patterns (CuKa1 radiation) show characteristic peaks at about 5.68, 2.78, 2.61, 2.15 and about 1.73 angstroms (or about 15.60, 32.02, 34.25, 41.94, 52.74 if expressed as 2θ angles). The width at the half height of the most intense peak at about 15.60 two θ angle was about 0.96 degree 2θ which would correspond to the 85 Å crystal size of Dawsonite.

EXAMPLE 2

A portion of the sample prepared according Example 1 was additionally heated for 2 hours at 315° C. in the air circulated oven. The sample lost 15.2% weight upon this treatment. This loss in weight indicates a partial decomposition of the Dawsonite precursor. The FTIR spectrum of the product showed that another yet unidentified carbonate compound still remained in the final product.

EXAMPLE 3

The procedure described in Example 1 was used except that a sodium acetate solution was applied instead of water. The solution was prepared by dissolving 20 g anhydrous sodium acetate (99% purity—Sigma—Aldrich, St. Louis, Mo.) in 80 g of water. About 16 g of this solution was used to nodulize a solid mixture of about 15 g T-200® sesquicarbonate and 35 g A-300 alumina into particulates. After curing for about 2 hours, the sample was calcined at 100° C. for 2 hours. The 7×20 mesh size fraction of this sample was screened out for further analysis. The sample lost about 21.2% weight upon heating at 100° C.

EXAMPLE 4

The sample prepared in Example 3 was further heated at 315° C. as described in Example 2. The sample lost 18.9% weight upon this treatment.

There are very similar patterns of the samples produced according Examples 1 and 3. In both cases, the formation of the basic sodium aluminum carbonate (Dawsonite) occurs at mild conditions of treatment (short time, no hydrothermal environment and temperature as low as 100° C.).

The samples calcined at a higher temperature also showed similarities but the material prepared in the presence of acetate had some residual acetate along with the remaining carbonate.

EXAMPLE 5

A sample of Solvay T-50® sesquicarbonate was screened to separate the 7×20 mesh fraction. T-50® sesquicarbonate is the coarser version of T-200®. It is less pure (6.4% $H_2O$ insoluble) and more dense that T-200 and has about 34 wt-% particles larger that 20 mesh.

The sample lost about 15.5 wt-% upon calcination at 100° C. and about 26.80% upon calcination at 315° C.

Analysis showed that the material maintains its original Na sesquicarbonate structure when heated to 100° C. but converts to $Na_2CO_3$, as expected, upon heating at 315° C.

EXAMPLE 6

The HCl removal capability of the samples prepared according this invention was measured in a greaseless McBain device consisting of a glass manifold where eight spring balances were attached. Each of these compartments could be heated separately while all the samples, which were attached in small baskets to the balances, could be evacuated and then exposed at 22° C. to 5 torr HCl pressure for a period of up to 24 hours. The weight increase due to HCl pickup was then measured. A pressure control system kept the pressure constant in the course of this experiment—the HCl consumed was quickly replenished.

The catalytic reactivity of the sample was determined after the completion of the HCl loading experiments in the same McBain device. The manifold with all samples was evacuated to remove the HCl and filled up with 100 torr 1,3 butadiene at 22° C. The pressure was then maintained for about 48 hours while periodically reading the weight change of each sample. The increased sample weight was attributed to side reactions of butadiene leading to formation of heavy residue and eventually to coke precursors. Less weight increase is the desired property of the HCl scavengers in this test.

Table 2 summarizes the testing data for the samples of this invention and some reference samples. Reference A is commercially available sodium doped alumina guard. Reference B stands for an alumina based industrial HCl scavenger modified with alkali metals and additives to reduce the catalytic reactivity while Reference C contains both Zn and Na as described in the U.S. Pat. No. 6,558,641.

TABLE 2

| Sample | Thermal Treatment, ° C. | BET Surface Area, $m^2/g$ | Weight Increase upon HCl Exposure, % | Butadiene Loading, % |
|---|---|---|---|---|
| Reference "A" | 230 | 200 | 12.52 | 4.66 |
| Reference "A" | 100 |  | 12.24 | 2.78 |
| Reference "C" | 100 | 95 | 18.15 | 0.40 |
| Reference "B" | 100 | 209 | 11.71 | 1.01 |
| Example 1 | 100 | 143* | 15.69 | 2.24 |
| Example 2 | 230 | 169 | 14.58 | 1.57 |
| Example 4 | 230 | 141 | 11.92 | 0.27 |
| Example 5 | 230 | 3 | 5.93 | 0.01 |

*The evacuation temperature for BET measurement was 100° C. In all other cases the standard treatment temperature of 300° C. has been applied prior BET measurement.

The data in Table 2 shows that the natural carbonate alone (Example 5) exhibits substantial chloride pickup and very low reactivity. The low BET surface area and porosity would be a barrier for its direct application as a scavenger. However, the chemical analysis of the spent sample after the run in the McBain device revealed that the natural carbonate has picked up about 11.5% chloride—a very good performance for these types of materials.

The composite materials according Examples 1, 2 and 4 demonstrate very good properties exceeding these of the alumina based commercial products in Table 2 Note that the only sample that has a better performance than the sample from Example 1 is the Reference "C" that contains about 40% ZnO in addition to the alkali metal component and, hence, is much more expensive.

Table 2 shows that the presence of sodium acetate in the composite scavenger helps to further reduce the reactivity with the hydrocarbon stream to a level that is better than that of the Reference "C" sample.

Chloride adsorption data also indicates that the composite according this invention assures a superior rate of the process. The chloride pickup of the sample from Example 1 after 1 hour is even better than that with Reference "C" sample which had the highest weight pickup after longer exposure to HCl.

EXAMPLE 7

A 122 cm (4 ft) rotating pan device was used to continuously form beads by simultaneously adding T-200® sesquicarbonate powder and A-300 alumina transition alumina (TA) powder in a mass ratio of about 0.50 while spraying the powders with water. The water feeding rate was adjusted to provide for sufficient agglomeration and maximize the content of the 5×8 mesh size fraction. The "green" agglomerates were collected after discharging from the rotating pan and subjected to "drum" curing at ambient temperature.

EXAMPLE 8

The cured agglomerates produced in Example 7 were activated in an air circulated oven at about 105° C. for about 1.5 hours. The product had a bulk density of about 889 kg/m$^3$ (55.5 lb/ft$^3$) and BET surface area of 126 m$^2$/g.

EXAMPLE 9

The cured agglomerates produced in Example 7 were activated in an air circulated oven at about 400° C. for about 1.5 hours. The product had a bulk density of about 673 kg/m$^3$ (42 lb/ft$^3$) and BET surface area of 145 m$^2$/g.

EXAMPLE 10

The performance of selected samples to scavenge HCl was determined with about 56 cubic centimeters sample in a flow reactor at a space velocity of about 580 hr$^{-1}$ and 22° to 23° C. temperature. A gas blend of about 1% HCl in nitrogen was used and the breakthrough of HCl out the bed was indicated by the pH change of calibrated NaOH solutions. The adsorbent bed consisted of five equal segments which were separately discharged, following brief purge with nitrogen, after the HCl breakthrough was detected. The chloride content of each spent sample was then analyzed. The results for selected samples are shown in Table 3 below. Note that the Cl content of the first four portions of the spent samples from Example 8 is not only high but also practically constant which points out to an excellent mass transfer. The Reference "C" sample had the highest Cl pick at the inlet of the bed but then the Cl content diminished in the next portions of the bed. More importantly, the spent sample after the run was not any more free flowing and clumped in one piece. Table 3 also show that the sample prepared according Example 9 has higher Cl pick up than the Reference "A" sample

TABLE 3

| | Chloride content of the spent samples, mass % | | | |
|---|---|---|---|---|
| Sample | Reference A | Reference C | Example 8 | Example 9 |
| Inlet | 11.80 | 35.10 | 22.90 | 15.10 |
| Position 2 | 12.40 | 32.50 | 23.00 | 16.00 |
| Position 3 | 12.50 | 28.30 | 23.20 | 15.40 |
| Position 4 | 10.60 | 17.50 | 23.50 | 15.00 |
| Outlet | 4.85 | 4.37 | 9.75 | 9.87 |

Examples 8 and 9 disclose a cost effective way to make the particulates useful in the practice of the present invention. This method comprises feeding natural carbonate (sesquicarbonate) powder and flash calcined alumina into a rotating pan nodulizer while spraying with water to form particulates, followed by curing and activation. Optionally, sodium acetate or another aqueous solution can be sprayed instead of water for the purpose of adding an active component and reducing the reactivity. The most effective ratios between carbonate and alumina in the solid mix are at least 0.15. Curing can be done at any temperature below 100° C. Higher temperature is preferred. The material should be activated at least at 100° C. to get a usable chloride scavenger.

There are other practical ways to produce the composite sorbent of the present invention. One of the possible approaches involves preparing pellets of the solid mix followed by contacting the pellets with liquid. Application of known extrusion techniques is another approach. Still another approach, especially effective in the case of scavengers with low content of active component, is preparing a solution of the natural carbonate and contacting this solution with a preformed macroporous support. Increased temperature can be used to accommodate more alkali metal into solution.

The method of this invention is unique since the solid components reacts during the forming and curing steps to produce a different compound—hydroxyl carbonate. This compound and the products of its thermal decomposition are very useful as scavengers for HCl and other acid gases.

What is claimed is:

1. A process for the removal of at least one hydrogen halide from a fluid hydrocarbon-containing stream comprising hydrogen, hydrocarbons, water and hydrogen halide, wherein said process comprises contacting said fluid stream with a sorbent material in a packed bed, said sorbent material comprising a composite of at least one alumina and at least one solid metal carbonate produced from a sesquicarbonate compound wherein said alumina and sesquicarbonate are present in a ratio of about 0.8 to about 5.

2. The process of claim 1 wherein said hydrogen halide is selected from the group consisting of hydrogen chloride, hydrogen fluoride, hydrogen iodide, hydrogen bromide and mixtures thereof.

3. The process of claim 1 wherein the fluid stream comprises a net hydrogen stream from a catalytic reforming process and said hydrogen halide is hydrogen chloride.

4. The process of claim 1 wherein the fluid stream comprises a net hydrogen stream from a light paraffin dehydrogenation process and said hydrogen halide is hydrogen chloride.

5. The process of claim 1 wherein said sorbent material was mixed with water or an aqueous solution of a metal salt and then heated at a temperature of about 100° C.

6. The process of claim 1 wherein said solid metal carbonate is a hydroxycarbonate.

7. The process of claim 1 wherein said solid metal carbonate is a sesquicarbonate compound.

* * * * *